US012738977B2

(12) United States Patent
Yoon et al.

(10) Patent No.: US 12,738,977 B2
(45) Date of Patent: Sep. 15, 2026

(54) DEVICES AND SYSTEMS INCLUDING TRANSMITTERS FOR BROADBAND MAGNETIC FIELD COMMUNICATION

(71) Applicant: Electronics and Telecommunications Research Institute, Daejeon (KR)

(72) Inventors: Kye Seok Yoon, Daejeon (KR); In Kui Cho, Daejeon (KR); Jung Hoon Oh, Daejeon (KR); Jang Yeol Kim, Daejeon (KR); Hyun Joon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 216 days.

(21) Appl. No.: 18/889,309

(22) Filed: Sep. 18, 2024

(65) Prior Publication Data

US 2025/0096845 A1 Mar. 20, 2025

(30) Foreign Application Priority Data

Sep. 18, 2023 (KR) ........................ 10-2023-0123890

(51) Int. Cl.
*H04B 5/24* (2024.01)
*H04B 1/00* (2006.01)
*H04B 5/43* (2024.01)

(52) U.S. Cl.
CPC ............. *H04B 5/24* (2024.01); *H04B 1/0078* (2013.01); *H04B 5/43* (2024.01)

(58) Field of Classification Search
CPC .......... H04B 5/24; H04B 1/0078; H04B 5/43; H04B 2001/0408; H04B 5/26; H04B 5/72; H04B 1/40; H04B 5/79; H04B 1/1607; H04B 1/38; H04B 5/266; H04B 1/006; H04B 1/04; H03H 7/38; H03F 2200/451; H03F 2200/111; H03F 3/72; H04L 27/2278; H04L 27/364; H03G 3/3078; H03G 3/3052; H03G 1/0005
See application file for complete search history.

(56) References Cited

U.S. PATENT DOCUMENTS

| | | | |
|---|---|---|---|
| 10,447,165 | B2 | 10/2019 | Pan et al. |
| 10,833,638 | B2 | 11/2020 | Govindaraj |
| 11,038,374 | B2 | 6/2021 | Prabhala et al. |
| 11,190,042 | B2 | 11/2021 | Mao et al. |

(Continued)

FOREIGN PATENT DOCUMENTS

| | | | |
|---|---|---|---|
| EP | 3048686 | A1 | 7/2016 |
| EP | 3319207 | B1 | 9/2020 |

(Continued)

*Primary Examiner* — Lana N Le
(74) *Attorney, Agent, or Firm* — BROADVIEW IP LAW, PC

(57) ABSTRACT

A system for performing magnetic field communication is disclosed. According to one embodiment of the present disclosure, a system for performing magnetic field communication may include a first current mode power supply having a voltage and one or more inductors connected thereto; a power amplifier connected to the first current mode power supply; a first matching impedance unit including a first capacitor connected to the power amplifier; and a first magnetic field antenna including a coil and a resistor connected in parallel with the first matching impedance unit.

13 Claims, 13 Drawing Sheets

(56) References Cited

U.S. PATENT DOCUMENTS

| | | | | |
|---|---|---|---|---|
| 2017/0358951 | A1* | 12/2017 | Wheeland | H04B 5/24 |
| 2018/0337699 | A1* | 11/2018 | Lee | H04B 2001/0408 |
| 2021/0091800 | A1* | 3/2021 | Sawada | H04B 1/04 |
| 2023/0101152 | A1 | 3/2023 | Gu et al. | |
| 2024/0214009 | A1* | 6/2024 | Hanaoka | H04B 1/0078 |
| 2026/0051919 | A1* | 2/2026 | Li | H04B 1/40 |

FOREIGN PATENT DOCUMENTS

| | | | |
|---|---|---|---|
| KR | 10-2012-0134507 | A | 12/2012 |
| KR | 10-2022-0043591 | A | 4/2022 |
| KR | 10-2023-0045247 | A | 4/2023 |
| KR | 10-2023-0045979 | A | 4/2023 |

* cited by examiner

DEVICES AND SYSTEMS INCLUDING TRANSMITTERS FOR BROADBAND MAGNETIC FIELD COMMUNICATION

CROSS-REFERENCE TO RELATED APPLICATIONS

This application claims the benefit of earlier filing date and right of priority to Korean Application No. 10-2023-0123890, filed on Sep. 18, 2023, the contents of which are all hereby incorporated by reference herein in their entirety.

TECHNICAL FIELD

The present disclosure relates to a broadband (or wide-band) magnetic field communication technology, and more particularly, to a device and system including a transmitter capable of wideband magnetic field communication by keeping the current magnitude and phase constant in a wideband frequency band.

BACKGROUND

Communication system-related technologies are closely related to everyday life and almost all types of industrial fields, and the development of communication systems has played a major role in improving the quality of life of modern people.

FIG. 1 is a conceptual diagram briefly illustrating the configuration and operating principles of a communication system using an electric field. A transmitter is composed of a modulator and a transmitting antenna, and a receiver is composed of a receiving antenna, a filter, an amplifier, and a demodulator.

The transmitter can modulate data using a high frequency oscillator and drive the modulated data to the transmitting antenna using a power amplifier. The receiving antenna can apply a filter and amplifier to the transmitted signal to improve the signal quality and apply a demodulator to the signal to restore the data.

In general, wireless communication systems that utilize electric fields (e.g., cell phones, walkie-talkies) have the advantage of being able to send signals over long distances through the air by modulating and demodulating data at high frequencies.

SUMMARY

The technical problem of the present disclosure is to provide a device and system including a transmitter for wideband magnetic field communication.

In addition, the technical problem of the present disclosure is to provide a device and system that stably amplifies an input signal and drives a transmitting antenna using a magnetic field communication system structure.

Furthermore, the technical problem of the present disclosure is to provide a device and system including a magnetic field transmitter tank driving an antenna through a current mode source and parallel impedance matching.

The technical problems to be achieved in the present disclosure are not limited to the technical tasks mentioned above, and other technical problems not mentioned will be clearly understood by those skilled in the art from the description below.

According to one embodiment of the present disclosure, A system for performing magnetic field communication may include a first current mode power supply having a voltage and one or more inductors connected thereto; a power amplifier connected to the first current mode power supply; a first matching impedance unit including a first capacitor connected to the power amplifier; and a first magnetic field antenna including a coil and a resistor connected in parallel with the first matching impedance unit, and a input data input into the system may be converted into a digital signal by the first field-programmable gate array (FPGA), the power amplifier may perform a switching and amplifying operation based on the digital signal converted by the first FPGA, and the first magnetic field antenna may transmit the digital signal switched and amplified by the power amplifier to a second magnetic field antenna.

In addition, a modem, a phase mixer, and a digital comparator that process the input data may be integrated into the first FPGA.

In addition, the first magnetic field antenna and a direct current (DC) block capacitor may be connected in series.

In addition, in the first current mode power supply, i) the voltage and the at least one inductor may be connected in series, or ii) the voltage and a plurality of inductors are connected in parallel.

In addition, the system may include a second matching impedance unit including a second capacitor connected in parallel with the second magnetic field antenna; a filter unit; and a second FPGA connected to the filter section, and the second FPGA may include a demodulator.

In addition, a digital signal received through the second magnetic field antenna may be filtered using the filter unit, and a digital signal filtered by the filter unit may be demodulated through the second FPGA connected to the filter unit.

According to one embodiment of the present disclosure, a transmitting device performing magnetic field communication may include a first current mode power supply having a voltage and one or more inductors connected thereto; a power amplifier connected to the first current mode power supply; a first matching impedance unit including a first capacitor, connected to the power amplifier; and a first magnetic field antenna including a coil and a resistor, connected in parallel with the first matching impedance unit, and an input data input to the transmitter may be converted into a digital signal by the first field-programmable gate array (FPGA), the power amplifier may perform a switching and amplifying operation based on the digital signal converted by the first FPGA, and the first magnetic field antenna may transmit the digital signal switched and amplified by the power amplifier to a second magnetic field antenna included in a receiving device.

According to one embodiment of the present disclosure, a receiving device that performs magnetic field communication may include a second current mode power supply unit having a voltage and one or more inductors connected thereto; a filter unit connected to the second current mode power supply unit; a second matching impedance unit including a second capacitor connected to the filter unit; and a second magnetic field antenna including a coil and a resistor connected in parallel with the second matching impedance unit, and a data signal input from the transmitter through the second magnetic field antenna may be filtered by the filter unit, and the filtered data signal may be demodulated by a second field-programmable gate array (FPGA) including a demodulator.

In addition, the second magnetic field antenna and a direct current (DC) block capacitor may be connected in series.

And, within the second current mode power supply, i) the voltage and the at least one inductor may be connected in series, or ii) the voltage and a plurality of inductors may be connected in parallel.

The features briefly summarized above with respect to the disclosure are merely exemplary aspects of the detailed description of the disclosure that follows, and do not limit the scope of the disclosure.

According to various embodiments of the present disclosure, devices and systems including a transmitter for wide-band magnetic field communication can be provided.

In addition, by various embodiments of the present disclosure, the magnitude and phase of the current driven to the transmitting antenna are maintained constant even in a wide frequency band, so that a signal can be transmitted stably, and the communication bps (bit per second) speed can be increased so that a large amount of data can be transmitted.

Additionally, various embodiments of the present disclosure can increase the signal bandwidth by maintaining the magnitude and phase of the coil current insensitive to the signal frequency using a current mode source and parallel impedance matching.

Additionally, by various embodiments of the present disclosure, an efficient magnetic field communication system can be constructed without the need for additional devices, thereby reducing cost and manufacturing time.

The effects obtainable in the present disclosure are not limited to the effects mentioned above, and other effects not mentioned will be clearly understood by those skilled in the art from the description below.

DETAILED DESCRIPTION

Figure 1:
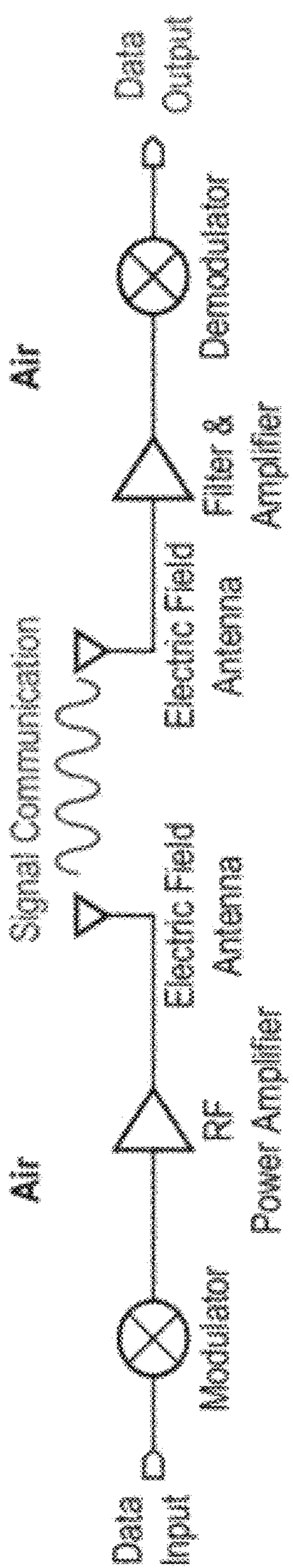
FIG. 1 is a conceptual diagram describing the configuration and operating principles of a communication system using an electric field.

Since the present disclosure can make various changes and have various embodiments, specific embodiments are illustrated in the drawings and described in detail in the detailed description. However, this is not intended to limit the present disclosure to specific embodiments, and should be understood to include all modifications, equivalents, and substitutes included in the idea and scope of the present disclosure. Similar reference numbers in the drawings indicate the same or similar function throughout the various aspects. The shapes and sizes of elements in the drawings may be exaggerated for clarity. Detailed description of exemplary embodiments to be described later refers to the accompanying drawings, which illustrate specific embodiments by way of example. These embodiments are described in sufficient detail to enable those skilled in the art to practice the embodiments. It should be understood that the various embodiments are different, but need not be mutually exclusive. For example, specific shapes, structures, and characteristics described herein may be implemented in another embodiment without departing from the idea and scope of the present disclosure in connection with one embodiment. Additionally, it should be understood that the location or arrangement of individual components within each disclosed embodiment may be changed without departing from the spirit and scope of the embodiment. Accordingly, the detailed description set forth below is not to be taken in a limiting sense, and the scope of the exemplary embodiments, if properly described, is limited only by the appended claims, along with all equivalents as claimed by those claims.

In this disclosure, terms such as first and second may be used to describe various components, but the components should not be limited by the terms. These terms are only used for the purpose of distinguishing one component from another. For example, a first element may be termed a second element, and similarly, a second element may be termed a first element, without departing from the scope of the present disclosure. The term and/or includes a combination of a plurality of related recited items or any one of a plurality of related recited items.

When an element of the present disclosure is referred to as being "connected" or "connected" to another element, it may be directly connected or connected to the other element, but it should be understood that other components may exist in the middle. On the other hand, when an element is referred to as "directly connected" or "directly connected" to another element, it should be understood that no other element exists in the middle.

Components appearing in the embodiments of the present disclosure are shown independently to represent different characteristic functions, and do not mean that each component is composed of separate hardware or a single software component. That is, each component is listed and included as each component for convenience of description, and at least two components of each component are combined to form one component, or one component can be divided into a plurality of components to perform functions. An integrated embodiment and a separate embodiment of each of these components are also included in the scope of the present disclosure unless departing from the essence of the present disclosure.

Terms used in the present disclosure are only used to describe specific embodiments, and are not intended to limit the present disclosure. Singular expressions include plural expressions unless the context clearly dictates otherwise. In the present disclosure, terms such as “comprise” or “have” are intended to designate that there are features, numbers, steps, operations, components, parts, or combinations thereof described in the specification, and it should be understood that this does not preclude the possibility of the presence or addition of one or more other features, numbers, steps, operations, components, parts, or combinations thereof. That is, the description of “including” a specific configuration in the present disclosure does not exclude configurations other than the corresponding configuration, and means that additional configurations may be included in the practice of the present disclosure or the scope of the technical spirit of the present disclosure.

Some of the components of the present disclosure may be optional components for improving performance rather than essential components that perform essential functions in the present disclosure. The present disclosure may be implemented including only components essential to implement the essence of the present disclosure, excluding components used for performance improvement, and a structure including only essential components excluding optional components used only for performance improvement is also included in the scope of the present disclosure.

Hereinafter, embodiments of the present disclosure will be described in detail with reference to the drawings. In describing the embodiments of this specification, if it is determined that a detailed description of a related known configuration or function may obscure the gist of the present specification, the detailed description will be omitted. The same reference numerals are used for the same components in the drawings, and redundant descriptions of the same components are omitted.

The system and/or method/device (hereinafter simply referred to as the ‘system’) proposed in the present disclosure relates to a broadband (or wideband) magnetic field communication technology that maintains the current magnitude and phase constant in a wideband.

Figure 2:
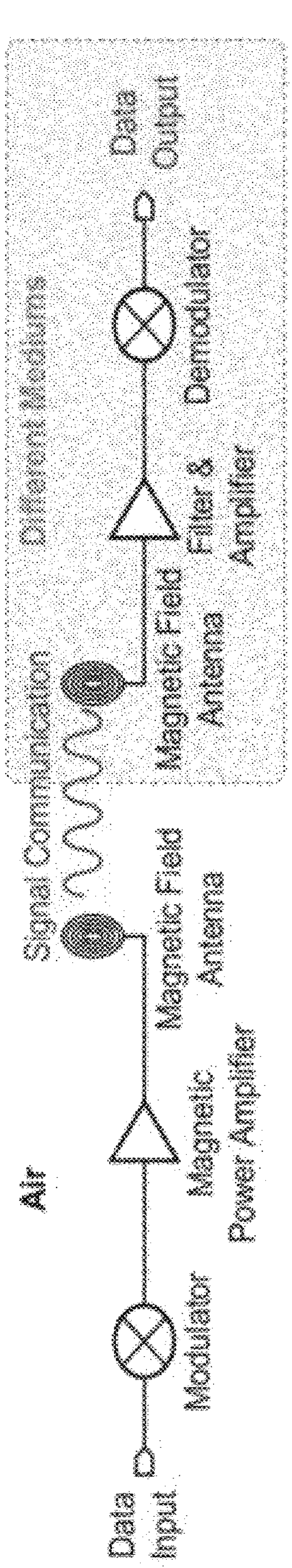
FIG. 2 is a conceptual diagram for explaining the configuration and operating principle of an electric field communication system operating in a different medium.

FIG. 2 is a conceptual diagram for explaining the configuration and operation of an electric field communication system operating in different media. Since electric field signals have the property of being reflected at different interfaces, signals may be reflected when they meet different media in the air. That is, even if a signal is transmitted in the air, it is reflected at the interface of different media, and there is a problem in that the signal cannot be received in fresh water or in rocky areas such as mines.

Figure 3:
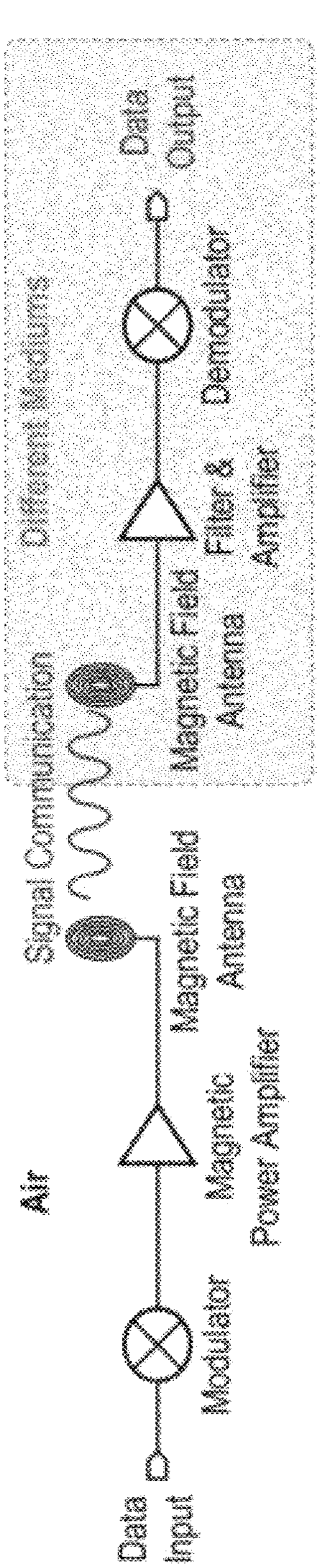
FIG. 3 is a conceptual diagram for explaining the configuration and operating principle of a magnetic field communication system according to an embodiment of the present disclosure.

To overcome the above-described problems, a magnetic field communication system such as that of FIG. 3 is being researched and developed. Although electric field signals cannot travel as far as electric field signals, they can be transmitted without being reflected at the boundary of different media. That is, when transmitting a magnetic field signal in the air, the magnetic field signal can also be transmitted in other media such as fresh water or rocky areas, and thus there is an advantage in that communication is possible.

For example, in the event of an accident in a mine, people in the mine can communicate with the outside ground through magnetic field communication, thereby minimizing casualties.

Compared to electric field communication that operates at hundreds of MHz to several GHz, magnetic field communication can operate at tens of kHz, so a design of a magnetic field communication transmitter that is suitable for magnetic field communication operating conditions may be required. In particular, in order to increase the data transmission rate, a transmitter design for wideband magnetic field communication that can operate stably at a wide frequency is required.

The transmitter design for magnetic field communication proposed previously is to improve energy efficiency from the perspective of wireless power transfer. For example, there has been research on controlling the transmitter in various modes to improve energy transfer efficiency, but the bandwidth, which is a key element of magnetic field communication, was not considered.

Hereinafter, a method of operating a wideband magnetic field communication system by amplifying an input signal and driving an antenna using a magnetic field communication transmitter structure according to the present disclosure will be described.

Figure 4A:
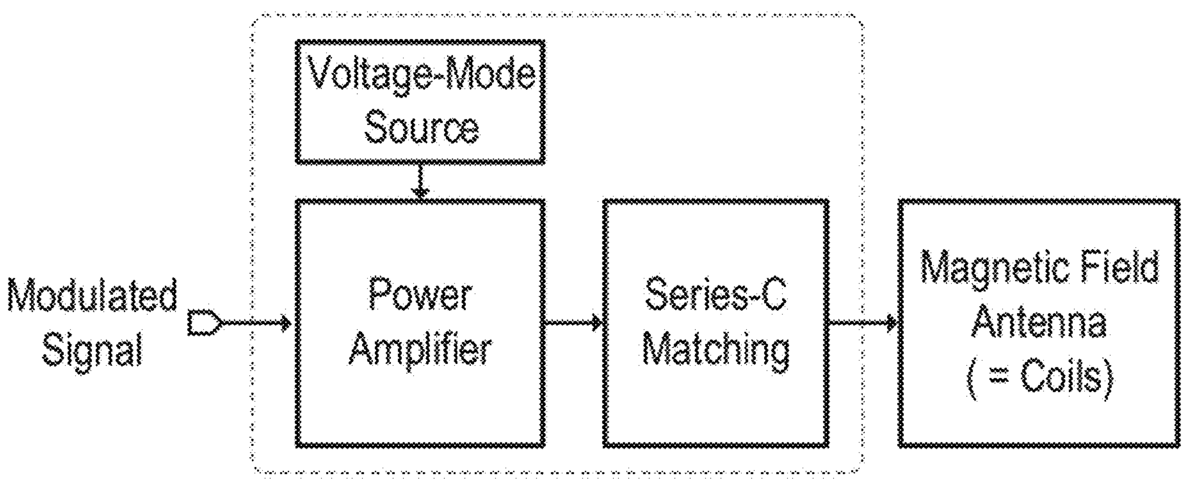
FIG. 4A and FIG. 4B are block diagrams for explaining the structure and operation of a magnetic field communication transmitter.
Figure 4B:
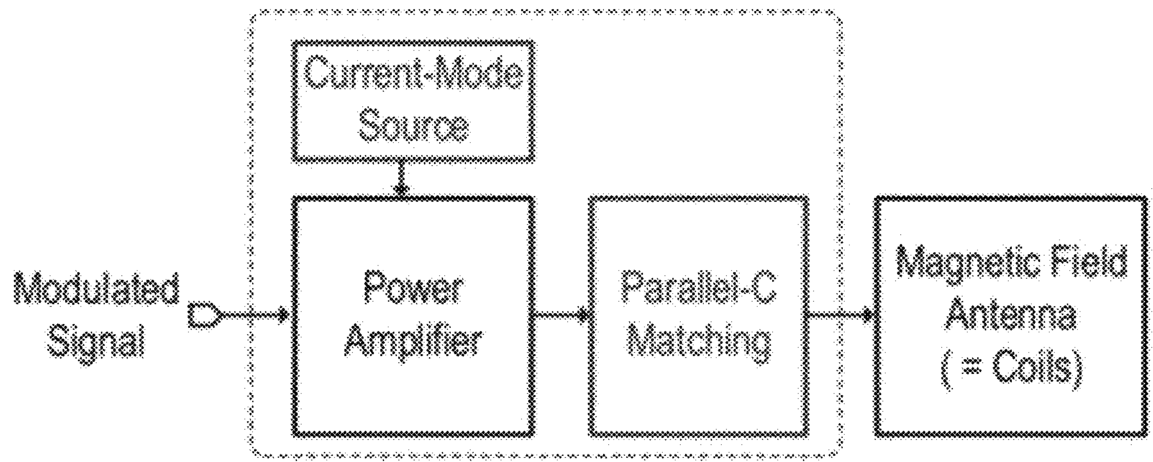

FIG. 4A and FIG. 4B are block diagrams for explaining the structure and operation of a magnetic field communication transmitter. Specifically, FIG. 4A is a block diagram for explaining a basic magnetic field communication transmitter structure, and FIG. 4B is a block diagram for explaining an improved magnetic field communication transmitter structure according to the present disclosure.

As illustrated in of FIG. 4A, a basic magnetic field communication transmitter may include a voltage mode source (e.g., a voltage power supply), a power amplifier, and a series impedance matching. As described above, a magnetic field communication system for energy transfer efficiency uses a voltage mode source to voltage-drive an antenna, and therefore, there is a problem that the antenna current magnitude and phase vary with frequency.

To solve the above-described problem, a transmitter structure using a current mode source and parallel impedance matching can be used, as shown in of FIG. 4B.

Specifically, the improved magnetic field communication transmitter according to the present disclosure may include a current mode source (e.g., a current power supply), a power amplifier, and a parallel impedance matching. In the case of the improved magnetic field communication transmitter, the current magnitude and phase of the antenna are kept constant even when the frequency of the signal changes, so that the data transmission rate can be increased.

Figure 5A:
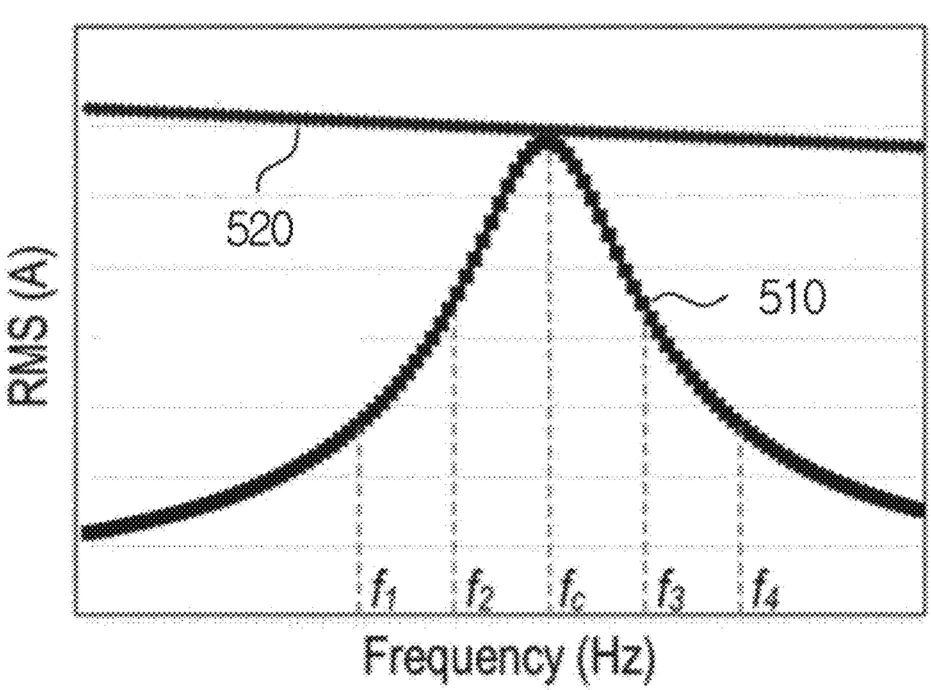
FIG. 5A and FIG. 5B are diagrams showing a graph comparing the size and phase of antenna current according to frequency.
Figure 5B:
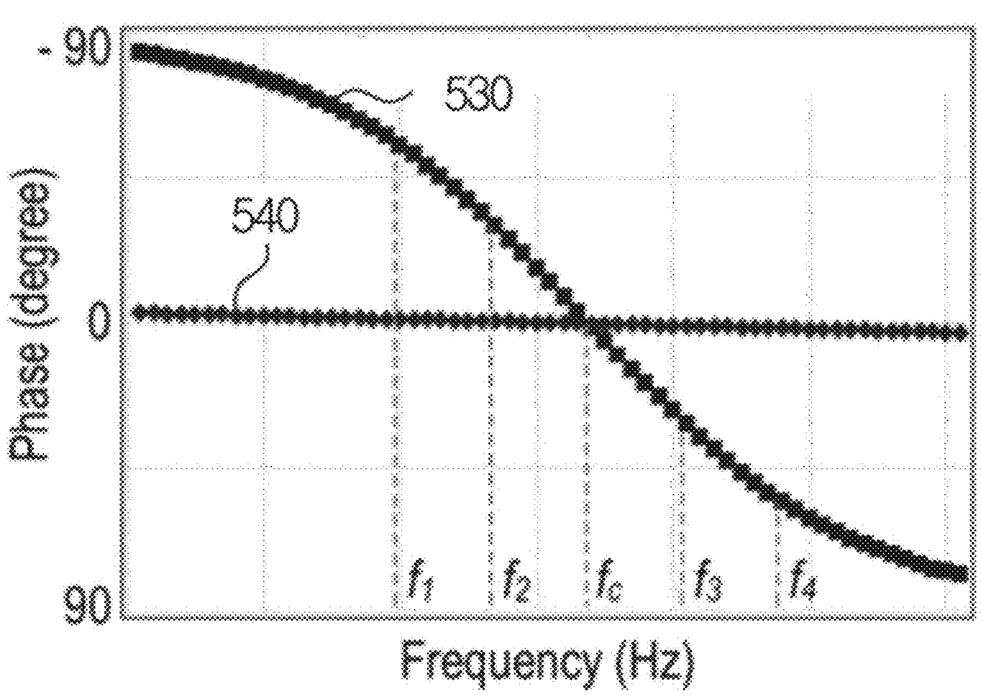

FIG. 5A and FIG. 5B are drawings showing a graph comparing the size and phase of antenna current according to frequency.

Specifically, FIG. 5A is a graph showing the antenna current magnitude (root mean square, RMS) (510) according to frequency in a basic magnetic field communication transmitter and the antenna current magnitude (520) according to frequency in an improved magnetic field communication transmitter. FIG. 5B is a graph showing the phase (degree) (530) of current according to frequency in a basic magnetic field communication transmitter and the phase (540) according to frequency in an improved magnetic field communication transmitter.

Referring to FIG. 5A, in a basic magnetic field communication transmitter, the RMS value decreases each time the center frequency ($f_c$) increases (e.g., $f_3$, $f_4$, etc.) or decreases (e.g., $f_1$, $f_2$, etc.), but in an improved magnetic field communication transmitter, the RMS value can be relatively constant even when the frequency changes.

Also, referring to of FIG. 5B, in a basic magnetic field communication transmitter, the phase value decreases as the frequency increases, but in an improved magnetic field communication transmitter, the phase value can be constant even when the frequency changes.

That is, in the improved magnetic field communication transmitter, the antenna current size and phase can be kept relatively constant even if the frequency component of the input signal changes.

Figure 6A:
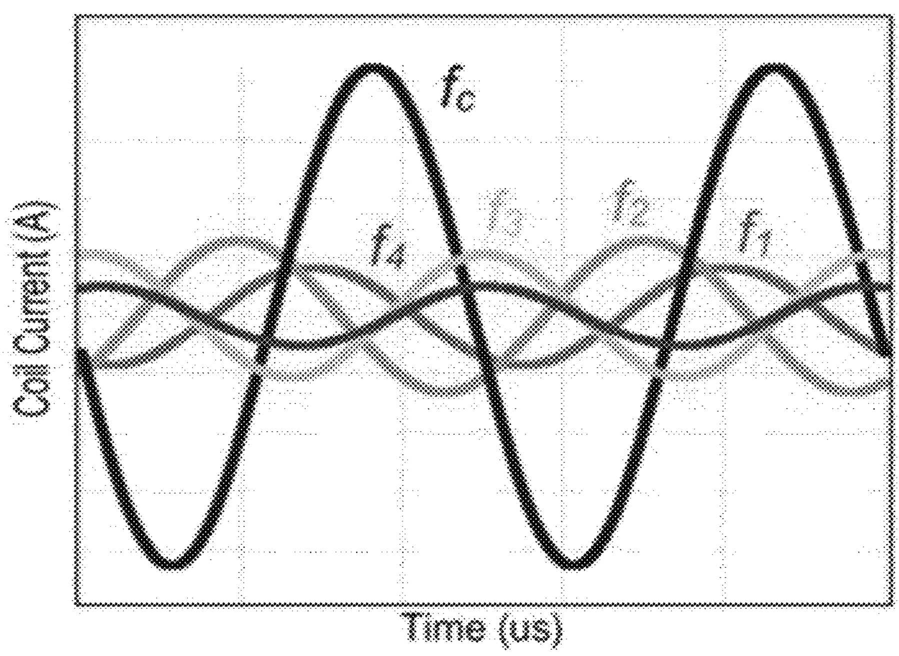
FIG. 6A and FIG. 6B are diagrams showing a graph for comparing antenna current waveforms according to frequency change.
Figure 6B:
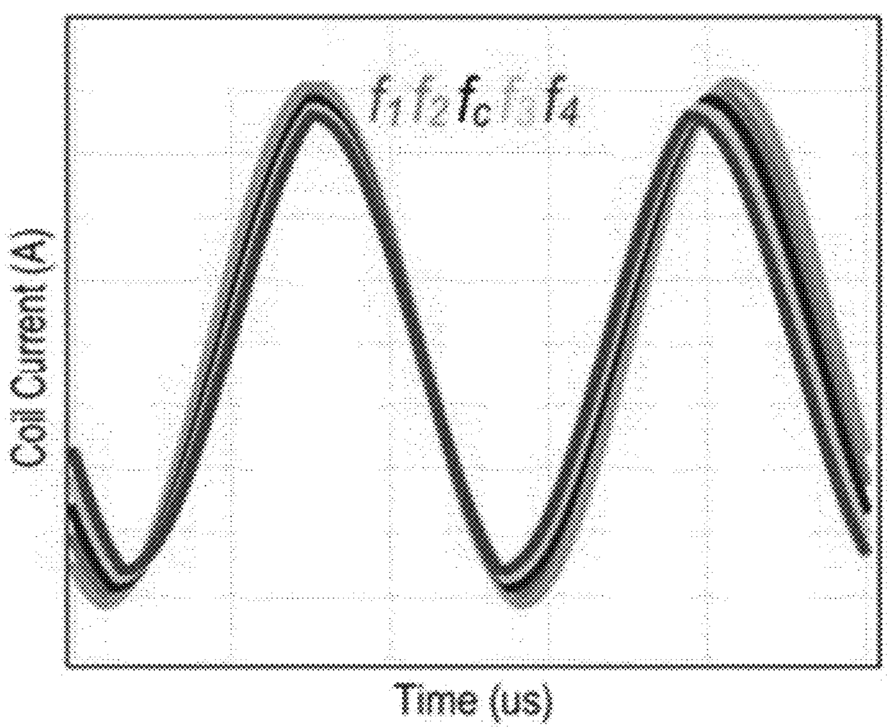

FIG. 6A and FIG. 6B are drawings showing a graph for comparing antenna current waveforms according to frequency change.

Specifically, FIG. 6A is a graph for comparing antenna current waveforms according to frequency change in a basic magnetic field communication transmitter, and FIG. 6B is a graph for comparing antenna current waveforms according to frequency change in an improved magnetic field communication transmitter according to the present disclosure.

Referring to FIG. 6A, in a basic magnetic field communication transmitter, when an input signal of a center frequency is input, a large antenna current can be driven, but the size and phase of the current can change as the frequency changes.

Referring to of FIG. 6B, in the improved magnetic field communication transmitter according to the present disclosure, the size and phase of the current can be relatively kept constant even when the frequency is changed. That is, the phase of the input signal and the antenna current can be kept the same, and signal distortion can not occur. Accordingly, the data transmission speed can be increased, and wideband magnetic field communication can be implemented.

Figure 7:
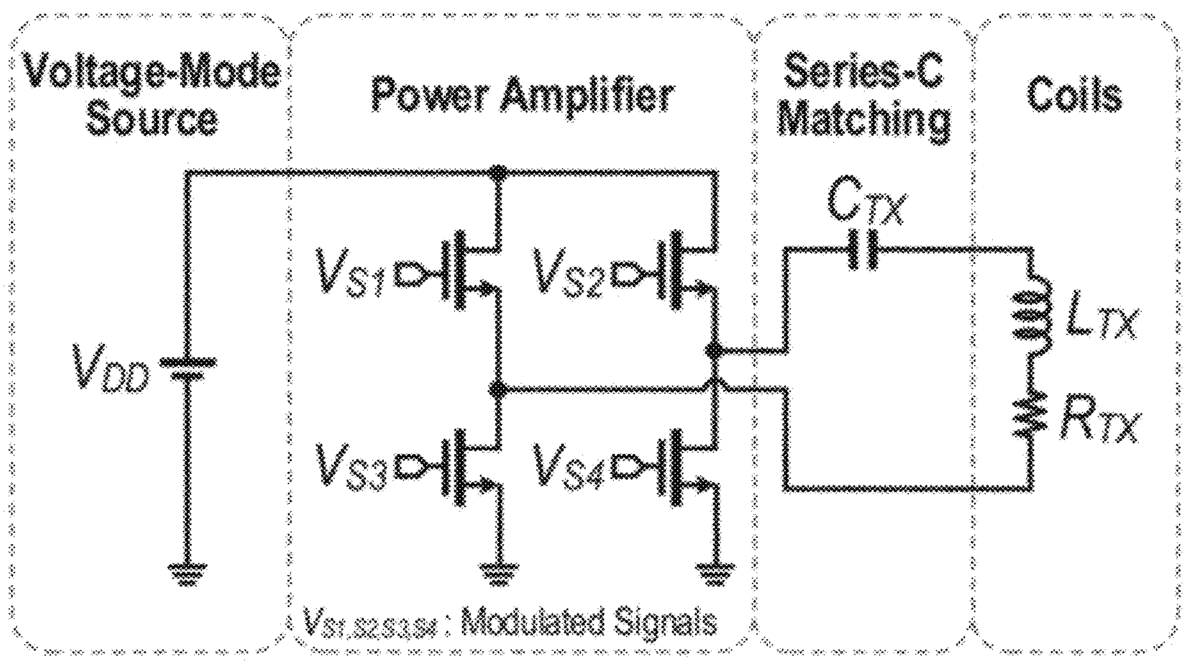
FIG. 7 is a diagram for explaining a basic magnetic field communication transmitter circuit diagram according to an embodiment of the present disclosure.
Figure 8:
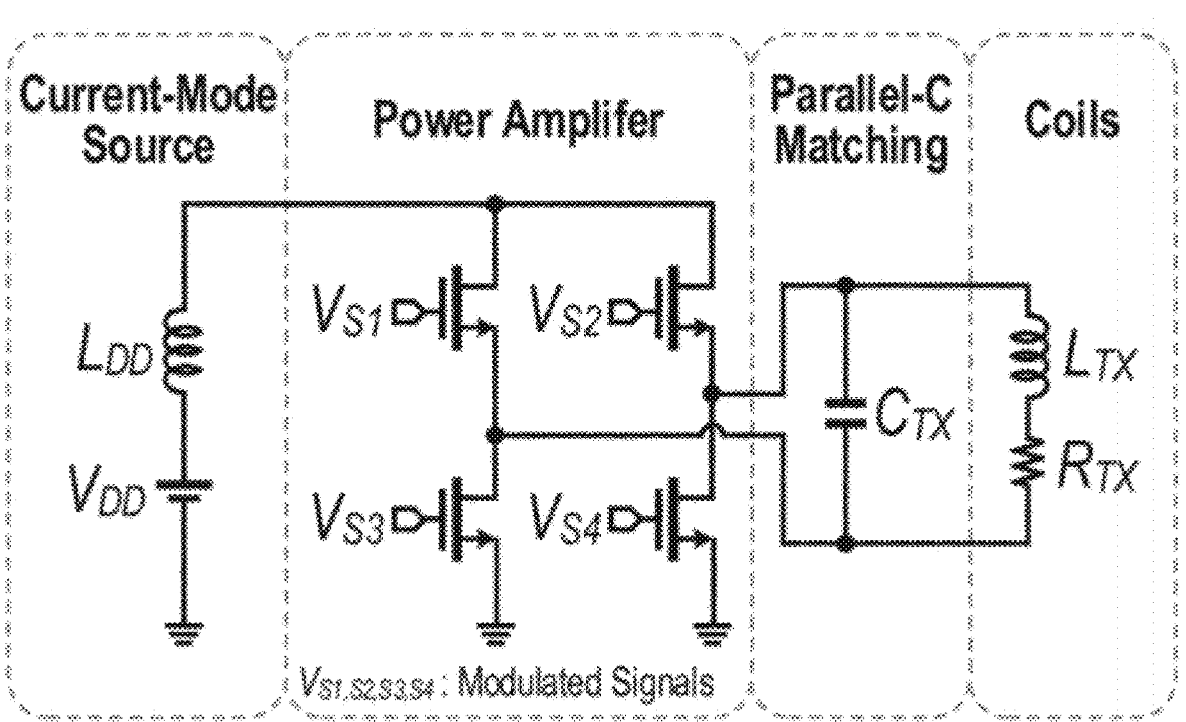
FIG. 8 illustrates an improved magnetic field communication transmitter circuit diagram that can be applied to the present disclosure.

FIG. 7 illustrates a basic magnetic field communication transmitter circuit diagram, and FIG. 8 illustrates an improved magnetic field communication transmitter circuit diagram that can be applied to the present disclosure.

As shown in FIGS. 7 and 8, the antenna can be modeled as a coil inductor (LTX) and a parasitic resistance (RTX).

For example, as illustrated in FIG. 7, in a basic magnetic field communication transmitter circuit diagram, impedance matching can be implemented with a structure in which an impedance matching capacitor (CTX) and an antenna are connected in series.

For example, as illustrated in FIG. 8, in the improved magnetic field communication transmitter circuit diagram, parallel impedance matching can be implemented with a structure in which an impedance matching capacitor (CTX) and an antenna are connected in parallel. And, as a large inductor (LDD) is arranged in the improved magnetic field communication transmitter circuit diagram, the transmitter can operate as a current mode source.

Figure 9:
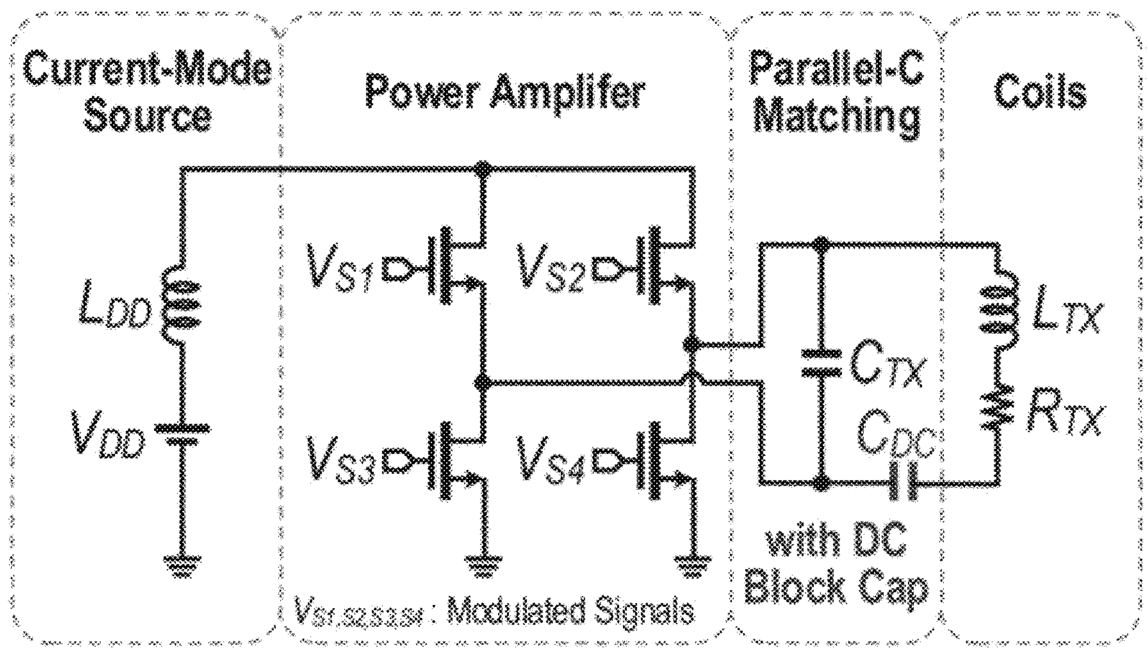
FIG. 9 illustrates another improved magnetic field communication transmitter circuit diagram that can be applied to the present disclosure.

FIG. 9 illustrates another improved magnetic field communication transmitter circuit diagram that can be applied to the present disclosure.

A DC blocking capacitor may be additionally placed in the improved magnetic field communication transmitter circuit diagram illustrated in FIG. 8. Specifically, the parallel impedance matching may include a DC blocking capacitor, and the DC blocking capacitor may be connected in series with the antenna.

With the addition of the DC blocking capacitor, DC leakage current can be prevented when no input signal exists. When the DC blocking capacitor value is larger than the impedance matching capacitor value by a predefined value, the circuit diagram of FIG. 9 can operate in the same manner as the circuit diagram of FIG. 8.

Figure 10:
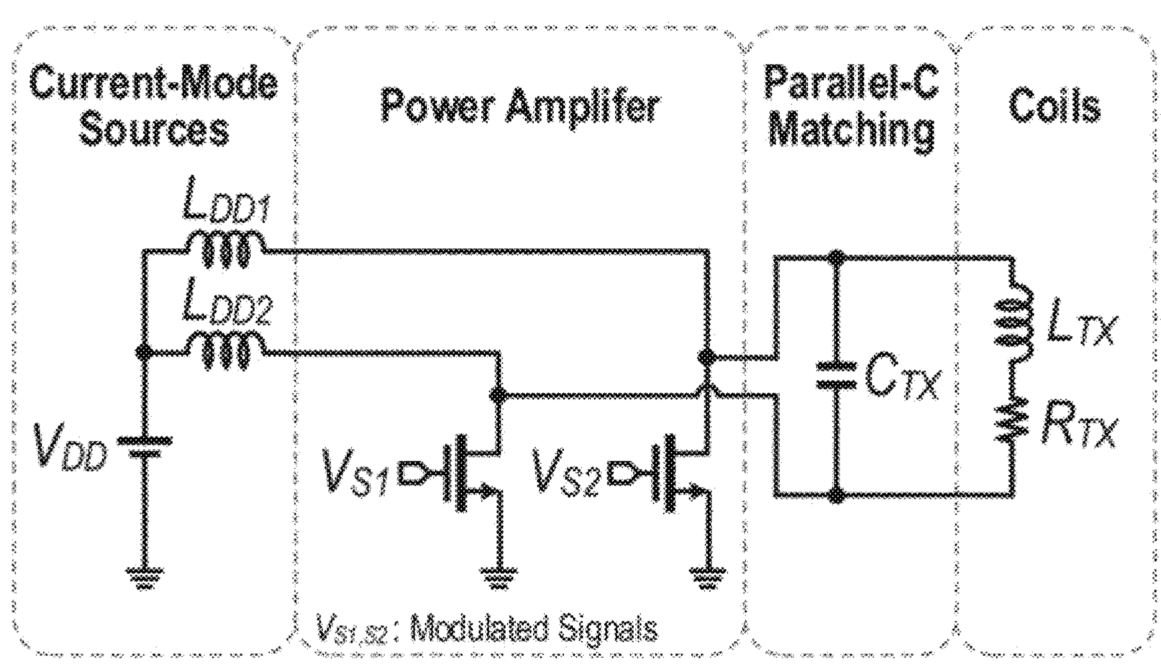
FIG. 10 illustrates another improved magnetic field communication transmitter circuit that can be applied to the present disclosure.

FIG. 10 illustrates another improved magnetic field communication transmitter circuit diagram that can be applied to the present disclosure.

As illustrated in FIG. 10, the current mode source(s) included in the improved magnetic field communication transmitter circuit diagram may include two inductors ($L_{DD1}$, $L_{DD2}$). In addition, the power amplifier may be implemented with a simple switch structure rather than a full-bridge structure. In other words, a wideband magnetic field communication transmitter may be implemented with a simple switch structure rather than a full-bridge structure.

The core of the improved magnetic field communication transmitter circuits described above is to implement wideband magnetic field communication transmitter operation by utilizing a current mode source and a parallel impedance matching structure together.

In the case of a magnetic field communication transmitter using a voltage mode source, there was a problem that the magnitude and phase of the coil current changed depending on the signal frequency, so there was a limit to increasing the signal bandwidth. According to one embodiment of the present disclosure, the structure of the magnetic field system can maintain the magnitude and phase of the coil current constant insensitive to the signal frequency by using a current mode source and parallel impedance matching, thereby making it possible to increase the signal bandwidth.

In addition, compared to conventional structures, the system according to one embodiment of the present disclosure does not require additional devices, thereby reducing the price and production time, and thus production of mass-produced products with competitive prices can be expected.

Figure 11:
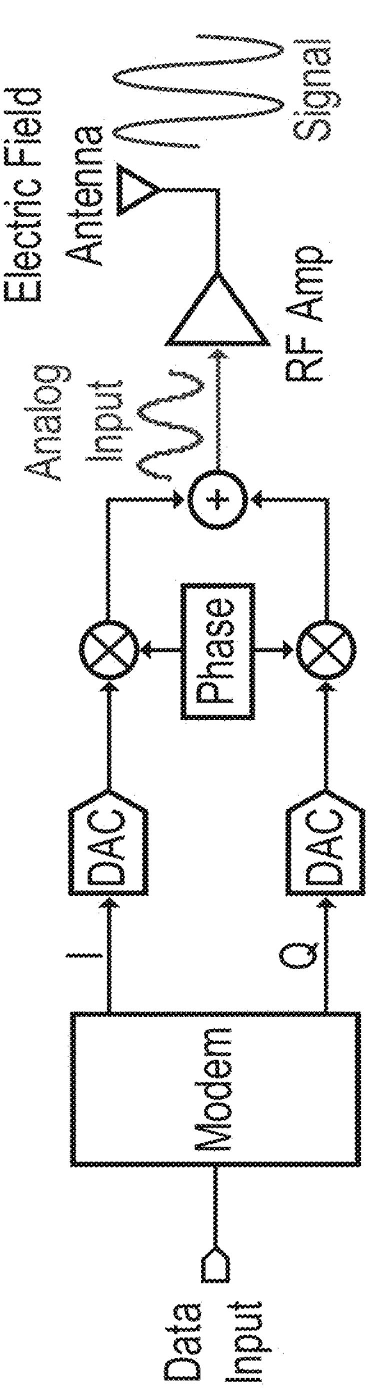
FIG. 11 is a diagram for explaining an electric field communication transmission system.

FIG. 11 is a drawing for explaining an electric field communication transmission system.

As illustrated in FIG. 11, the electric field communication system may include a modem, a digital-to-analog converter (DAC), a radio frequency (RF) power amplifier (RF Amp), a phase mixer, and an electric field antenna.

When voice or text data is input, the modem performs signal processing on the voice or text data to generate a modulated digital signal (I, Q). In the electric field communication system, a process of converting the generated digital signal into an analog signal through a DAC may be required.

Specifically, the electric field RF power amplifier has a linear amplifier structure and drives the antenna based on an analog input signal. That is, a DAC is required to drive the power amplifier in the electric field communication system.

Figure 12:
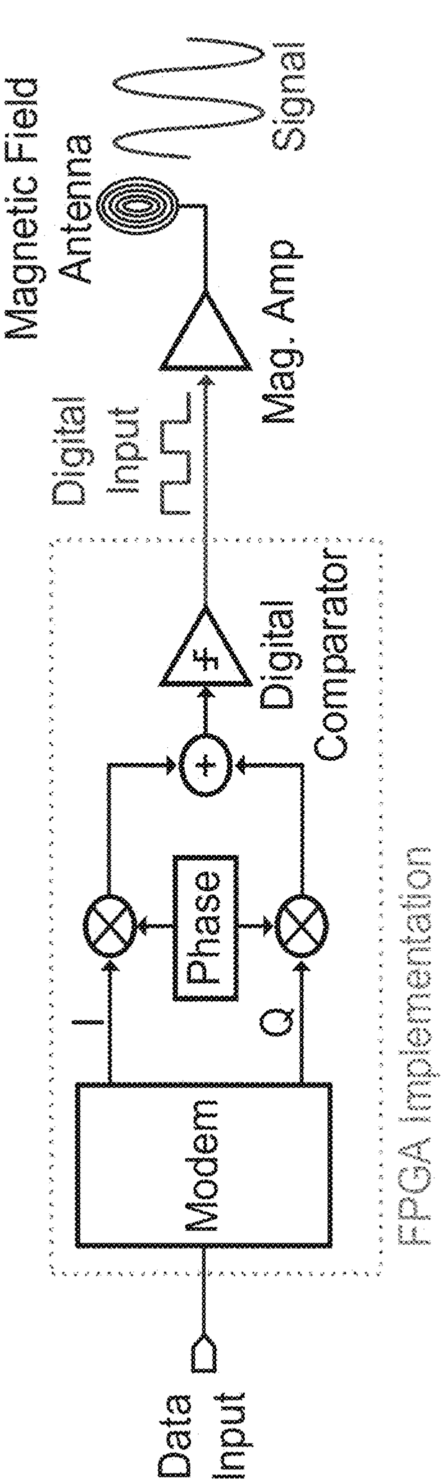
FIG. 12 is a diagram for explaining a magnetic field communication transmission system according to an embodiment of the present disclosure.

FIG. 12 is a drawing for explaining a magnetic field communication transmission system according to one embodiment of the present disclosure.

The magnetic field communication transmission system, unlike the electric field communication system of FIG. 11, does not include a DAC, and may not require a DAC. Specifically, the magnetic field power amplifier has a switching converter structure, and can receive a digital signal rather than an analog signal as an input signal.

That is, since the magnetic field power amplifier receives a digital signal as an input signal and is driven by a switching operation, unlike an electric field communication system, a magnetic field communication system may not require a DAC.

Specifically, since there is no need to generate an analog signal within the magnetic field communication system, the overall operation of the system can be achieved with a digital comparator without a DAC.

Accordingly, the modem, phase mixer, and digital comparator within the magnetic field communication system can be integrated via FPGA. That is, compared to the electric field wireless communication transmission system, the magnetic field communication system can be implemented compactly and simply.

Figure 13:
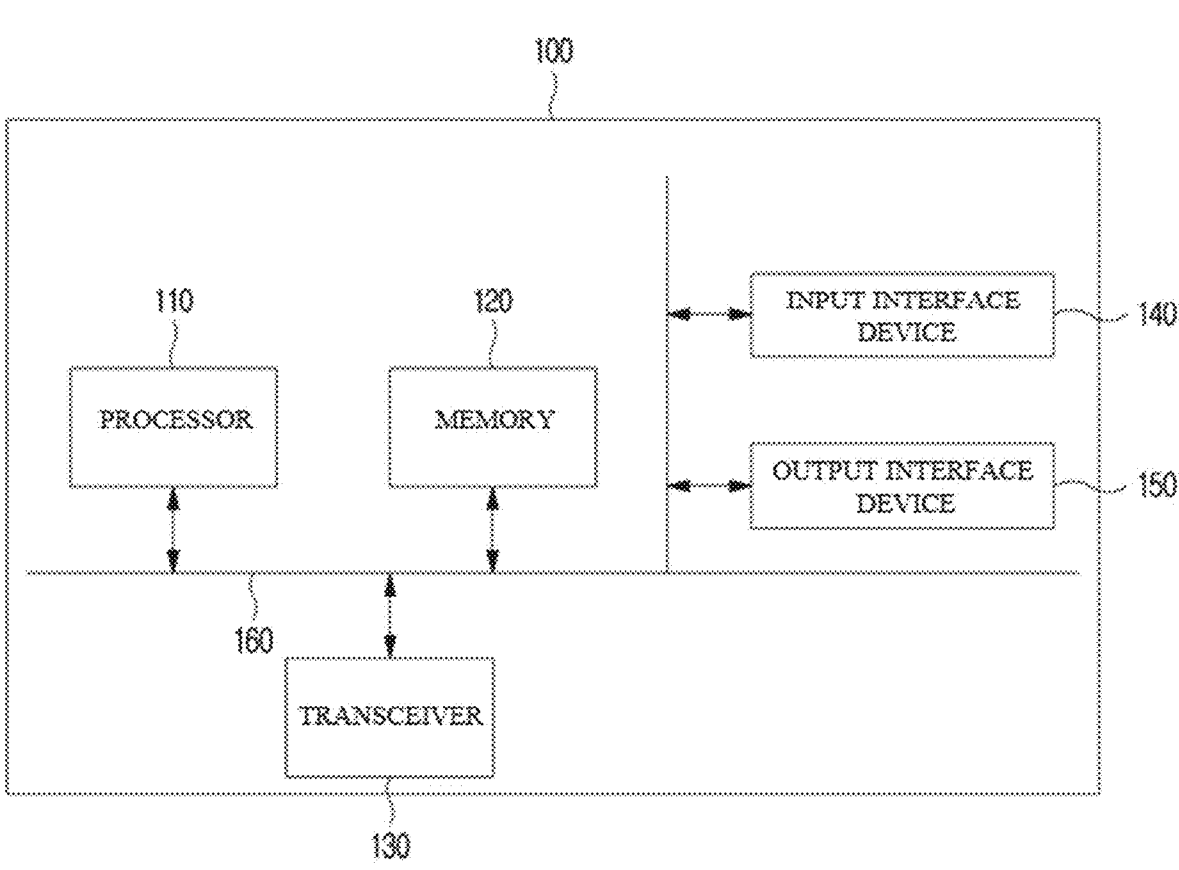
FIG. 13 is a block diagram illustrating a device according to an embodiment of the present disclosure.

FIG. 13 is a block diagram illustrating a device according to an embodiment of the present disclosure.

Specifically, a system performing magnetic field communication may be composed of a transmitting device and a receiving device, and the configuration of the transmitting device and the receiving device may be configured as in the device (100) illustrated in FIG. 13.

For example, the device (100) can perform magnetic field communication through an antenna that receives a magnetic field signal.

The device (100) may include at least one of a processor (110), a memory (120), a transceiver (130), an input interface device (140), and an output interface device (150). Each of the components may be connected to each other by a common bus (160). In addition, each of the components may be connected to each other through an individual interface or individual bus centered on the processor (110), rather than the common bus (160).

The processor (110) may be implemented in various types such as an AP (Application Processor), a CPU (Central Processing Unit), a GPU (Graphic Processing Unit), etc., and may be any semiconductor device that executes a command stored in the memory (120). The processor (110) may execute a program command stored in the memory (120). The processor (110) may be set to perform the method described based on FIGS. 1 to 12 described above.

The processor (110) may include one or more modules for performing magnetic field communication.

And/or, the processor (110) may store program instructions for implementing at least one function for one or more modules in the memory (120) so as to control the operations described based on FIGS. 1 to 12 to be performed. That is, each operation and/or function according to FIGS. 1 to 12 may be executed by one or more processors (110).

The memory (120) may include various forms of volatile or non-volatile storage media. For example, the memory (120) may include read-only memory (ROM) and random access memory (RAM). In an embodiment of the present disclosure, the memory (120) may be located inside or outside the processor (110), and the memory (120) may be connected to the processor (110) through various means already known.

The transceiver (130) may perform a function of transmitting and receiving data processed/to be processed in the processor (110) to and from an external device and/or an external system.

For example, a transceiver (130) of a transmitter may include a first current mode power supply having a voltage and one or more inductors connected thereto, a power amplifier connected to the current mode power supply, a first matching impedance unit including a first capacitor connected to the power amplifier, a first magnetic field antenna including a coil and a resistor connected in parallel with the first matching impedance unit, and a first FPGA (field-programmable gate array).

Specifically, a modem, a phase mixer, and a digital comparator for processing input data input to the transmitter may be integrated into the first FPGA.

Specifically, input data input into the system may be converted into a digital signal by a first FPGA (field-programmable gate array). The power amplifier may perform switching and amplifying operations based on the digital signal converted by the first FPGA. The first magnetic field antenna may transmit the digital signal switched and amplified by the power amplifier to a second magnetic field antenna included in the receiving device.

As an example of the present disclosure, a first magnetic field antenna and a DC (direct current) block capacitor may be connected in series. And, within the first current mode power supply, i) a voltage and at least one inductor may be connected in series, or ii) a voltage and a plurality of inductors may be connected in parallel.

Additionally, the transceiver (130) of the receiving device may include a second current mode power supply unit having a voltage and one or more inductors connected thereto, a filter unit connected to the current mode power supply unit, a second matching impedance unit including a second capacitor connected to the filter unit, a second magnetic field antenna including a coil and a resistor connected in parallel with the second matching impedance unit, and a second FPGA.

A data signal input from a transmitter through a second magnetic field antenna may be filtered and/or amplified by a filter unit (or/and an amplifier). The data signal filtered by the filter unit may be demodulated by a second FPGA (field-programmable gate array) including a demodulator.

Additionally, a second magnetic field antenna and a DC (direct current) block capacitor may be connected in series. And, within the second current mode power supply, i) a voltage and at least one inductor may be connected in series, or ii) a voltage and a plurality of inductors may be connected in parallel.

The input interface device (140) is configured to provide data to the processor (110).

The output interface device (150) is configured to output data from the processor (110).

Components described in the exemplary embodiments of the present disclosure may be implemented by hardware elements. For example, The hardware element may include at least one of a digital signal processor (DSP), a processor, a controller, an application specific integrated circuit (ASIC), a programmable logic element such as an FPGA, a GPU, other electronic devices, or a combination thereof. At least some of the functions or processes described in the exemplary embodiments of the present disclosure may be implemented as software, and the software may be recorded on a recording medium. Components, functions, and processes described in the exemplary embodiments may be implemented as a combination of hardware and software.

The method according to an embodiment of the present disclosure may be implemented as a program that can be executed by a computer, and the computer program may be recorded in various recording media such as magnetic storage media, optical reading media, and digital storage media.

Various techniques described in this disclosure may be implemented as digital electronic circuits or computer hardware, firmware, software, or combinations thereof. The above techniques may be implemented as a computer program product, that is, a computer program or computer program tangibly embodied in an information medium (e.g., machine-readable storage devices (e.g., computer-readable media) or data processing devices), a computer program implemented as a signal processed by a data processing device or propagated to operate a data processing device (e.g., a programmable processor, computer or multiple computers).

Computer program(s) may be written in any form of programming language, including compiled or interpreted languages. It may be distributed in any form, including stand-alone programs or modules, components, subroutines, or other units suitable for use in a computing environment. A computer program may be executed by a single computer or by a plurality of computers distributed at one or several sites and interconnected by a communication network.

Examples of information medium suitable for embodying computer program instructions and data may include semiconductor memory devices (e.g., magnetic media such as hard disks, floppy disks, and magnetic tapes), optical media such as compact disk read-only memory (CD-ROM), digital video disks (DVD), etc., magneto-optical media such as floptical disks, and ROM (Read Only Memory), RAM (Random Access Memory), flash memory, EPROM (Erasable Programmable ROM), EEPROM (Electrically Erasable Programmable ROM) and other known computer readable media. The processor and memory may be complemented or integrated by special purpose logic circuitry.

A processor may execute an operating system (OS) and one or more software applications running on the OS. The processor device may also access, store, manipulate, process and generate data in response to software execution. For simplicity, the processor device is described in the singular number, but those skilled in the art may understand that the processor device may include a plurality of processing elements and/or various types of processing elements. For example, a processor device may include a plurality of processors or a processor and a controller. Also, different processing structures may be configured, such as parallel processors. In addition, a computer-readable medium means any medium that can be accessed by a computer, and may include both a computer storage medium and a transmission medium.

Although this disclosure includes detailed descriptions of various detailed implementation examples, it should be understood that the details describe features of specific exemplary embodiments, and are not intended to limit the scope of the invention or claims proposed in this disclosure.

Features individually described in exemplary embodiments in this disclosure may be implemented by a single exemplary embodiment. Conversely, various features that are described for a single exemplary embodiment in this disclosure may also be implemented by a combination or appropriate sub-combination of multiple exemplary embodiments. Further, in this disclosure, the features may operate in particular combinations, and may be described as if initially the combination were claimed. In some cases, one or more features may be excluded from a claimed combination, or a claimed combination may be modified in a sub-combination or modification of a sub-combination.

Similarly, although operations are described in a particular order in a drawing, it should not be understood that it is necessary to perform the operations in a particular order or order, or that all operations are required to be performed in order to obtain a desired result. Multitasking and parallel processing can be useful in certain cases. In addition, it should not be understood that various device components must be separated in all exemplary embodiments of the embodiments, and the above-described program components and devices may be packaged into a single software product or multiple software products.

Exemplary embodiments disclosed herein are illustrative only and are not intended to limit the scope of the disclosure. Those skilled in the art will recognize that various modifications may be made to the exemplary embodiments without departing from the spirit and scope of the claims and their equivalents.

Accordingly, it is intended that this disclosure include all other substitutions, modifications and variations falling within the scope of the following claims.

What is claimed is:

1. A system for performing magnetic field communication, the system comprising: a first current mode power supply having a voltage and one or more inductors connected thereto; a power amplifier connected to the first current mode power supply; a first matching impedance unit including a first capacitor connected to the power amplifier; and a first magnetic field antenna including a coil and a resistor connected in parallel with the first matching impedance unit, wherein an input data inputted into the system is converted into a digital signal by a first field-programmable gate array (FPGA), wherein the power amplifier performs a switching and amplifying operation based on the digital signal converted by the first FPGA, and wherein the first magnetic field antenna transmits the digital signal switched and amplified by the power amplifier to a second magnetic field antenna.

2. The system of claim 1, wherein:

a modem, a phase mixer, and a digital comparator that process the input data are integrated into the first FPGA.

3. The system of claim 1, wherein:

the first magnetic field antenna and a direct current (DC) block capacitor are connected in series.

4. The system of claim 1, wherein: in the first current mode power supply, i) the voltage and the at least one inductor are connected in series, or ii) the voltage and the plurality of inductors are connected in parallel.

5. The system of claim 1, further comprising: a second matching impedance unit including a second capacitor connected in parallel with the second magnetic field antenna; a filter unit; and a second FPGA connected to the filter unit, and wherein the second FPGA includes a demodulator.

6. The system of claim 5, wherein: the digital signal received through the second magnetic field antenna is filtered using the filter unit, and the digital signal filtered by the filter unit is demodulated through the second FPGA connected to the filter unit.

7. A transmitting device performing magnetic field communication, the transmitting device comprising: a first current mode power supply having a voltage and one or more inductors connected thereto; a power amplifier connected to the first current mode power supply; a first matching impedance unit including a first capacitor, connected to the power amplifier; and a first magnetic field antenna including a coil and a resistor, connected in parallel with the first matching impedance unit, wherein an input data inputted to the transmitter is converted into a digital signal by a first field-programmable gate array (FPGA), wherein the power amplifier performs a switching and amplifying operation based on the digital signal converted by the first FPGA, and wherein the first magnetic field antenna transmits the digital signal switched and amplified by the power amplifier to a second magnetic field antenna included in a receiving device.

8. The transmitting device of claim 7, wherein: a modem, a phase mixer, and a digital comparator that process the input data are integrated into the first FPGA.

9. The transmitting device of claim 7, wherein:

the first magnetic field antenna and a direct current (DC) block capacitor are connected in series.

10. The transmitting device of claim 7, wherein: in the first current mode power supply, i) the voltage and the at least one inductor are connected in series, or ii) the voltage and the plurality of inductors are connected in parallel.

11. A receiving device that performs magnetic field communication, the receiving device comprising:

a second current mode power supply unit having a voltage and one or more inductors connected thereto;

a filter unit connected to the second current mode power supply unit;

a second matching impedance unit including a second capacitor connected to the filter unit; and a second magnetic field antenna including a coil and a resistor connected in parallel with the second matching impedance unit, wherein a data signal input from the transmitter through the second magnetic field antenna is filtered by the filter unit, and wherein the filtered data signal is demodulated by a second field-programmable gate array (FPGA) including a demodulator.

12. The receiving device of claim 11, wherein:

the second magnetic field antenna and a direct current (DC) block capacitor are connected in series.

13. The receiving device of claim 11, wherein: in the second current mode power supply, i) the voltage and the at least one inductor are connected in series, or ii) the voltage and the plurality of inductors are connected in parallel.

* * * * *